March 7, 1961 J. H. ANDRESEN, JR 2,973,702
CABIN PRESSURIZATION SYSTEM USING A.-C. POWER
Filed March 19, 1957 3 Sheets-Sheet 1

INVENTOR.
JOHN H. ANDRESEN, JR.
BY
ATTORNEYS

March 7, 1961  J. H. ANDRESEN, JR  2,973,702
CABIN PRESSURIZATION SYSTEM USING A.-C. POWER
Filed March 19, 1957  3 Sheets-Sheet 2

INVENTOR
JOHN H. ANDRESEN, JR.

BY

ATTORNEYS

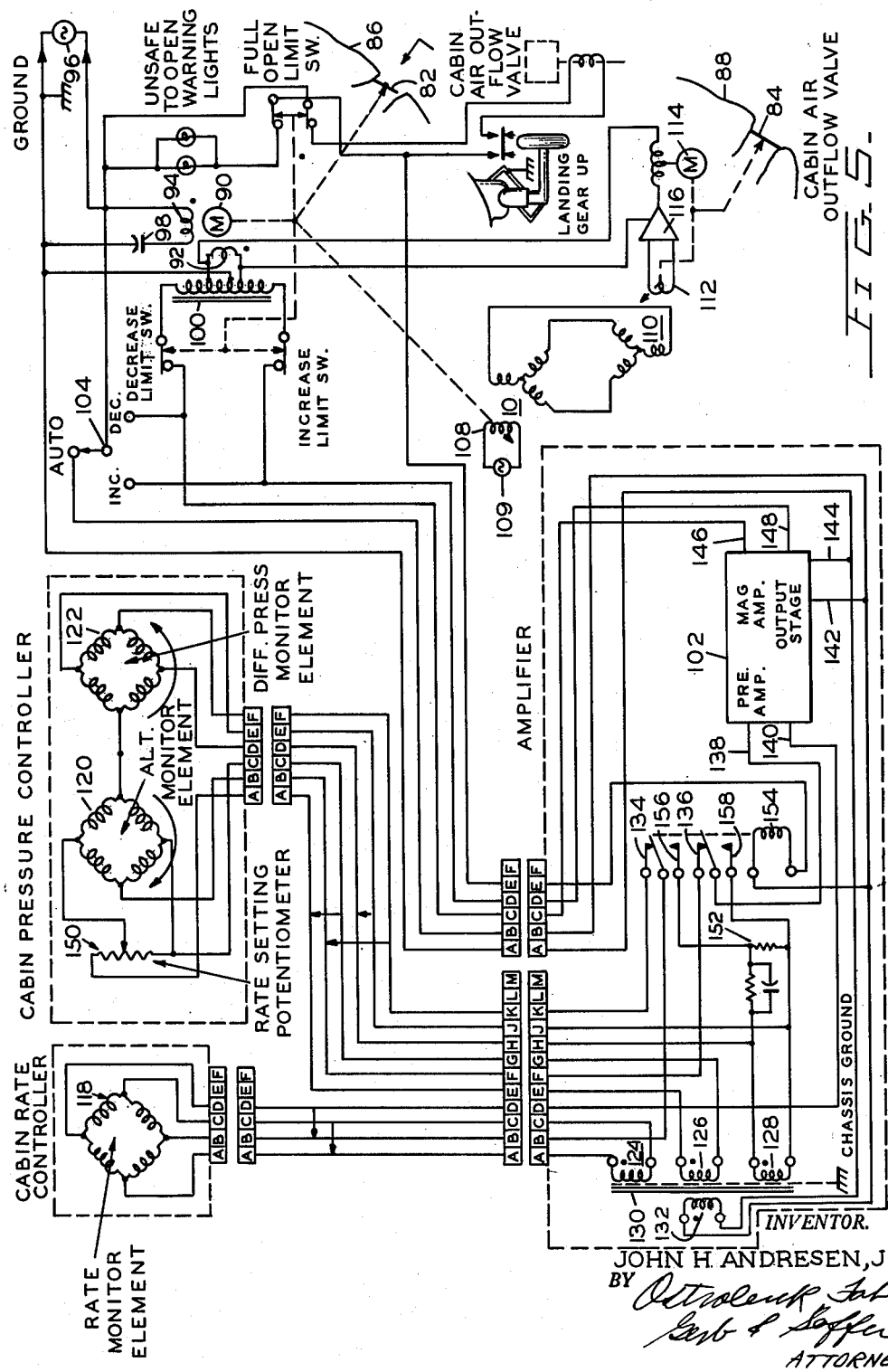

United States Patent Office 2,973,702
Patented Mar. 7, 1961

2,973,702

CABIN PRESSURIZATION SYSTEM USING A.-C. POWER

John H. Andresen, Jr., Greenwood Lake, N.Y., assignor to Kollsman Instrument Corporation, New York, N.Y., a corporation of New York Filed Mar. 19, 1957, Ser. No. 647,102

20 Claims. (Cl. 98—1.5)

This invention relates to a cabin pressurization system for aircraft which utilizes only A.-C. power and further includes the control of a plurality of control valves from a master valve by means of an electrical servo system.

Cabin pressurization systems for aircraft are well known and generally comprise a supercharger for bringing air into the cabin and an exhaust valve system for exhausting air from the cabin. In order to maintain predetermined cabin pressure conditions, the supercharger or the exhaust valve operation is controlled as a function of rate of change of cabin pressure, cabin pressure and the differential pressure, or the pressure difference between the cabin pressure and the altitude pressure.

It is necessary that the differential pressure be measured and maintained below a predetermined value since this is limited by the maximum allowable air frame stress due to cabin pressurization. The rate of change of cabin pressure must be measured and controlled since if it is too high, passengers will be subjected to uncomfortable and possibly dangerous conditions.

In the past, various pressure transducers or pressure monitors were provided for measuring cabin pressure, rate of change of cabin pressure, and differential pressure, and the output signals of the various pressure monitor elements were then combined and amplified in some manner. The net output then controls relays for connecting a D.-C. source of power to a D.-C. reversible motor which controls the operation of one or more exhaust valves responsive to the measured pressure conditions.

Thus, when the pressure monitoring system gives an output signal which indicates that the cabin pressure must be decreased, D.-C. power is connected to the valve control motor to open the valve so as to allow this required decrease in pressure to follow at a predetermined rate.

In a similar manner, when the pressure monitors call for an increase in cabin pressure, the relaying system will connect the D.-C. source of power to the D.-C. motor so as to reverse its direction of rotation and effect a closing of the valve to accomplish the required pressure increase.

In view of the required D.-C. power for motor operation, it has been necessary to provide a rectifying means or some other source of D.-C. power for operation of the pressure system on aircraft power in which primary power is A.-C.

In view of the required conversion equipment, the overall weight and complexity of the cabin pressure equipment is increased.

The principal object of this invention is to provide a cabin pressure system which utilizes A.-C. power alone to thereby eliminate the need for the heretofore required power conversions apparatus.

This novel system which could be adapted for operation with any type of pressure monitor transducer or pressure monitoring system utilizes an A.-C. motor which could be a two-phase induction motor whose direction of rotation is controlled in accordance with the phasing of the energization of one of the motor windings with respect to the constant phase of energization of another winding.

Thus, when an output signal of the pressure monitors requiring an increase in pressure is impressed upon the A.-C. motor control winding, there will be a first phase relationship between the energization of that winding and a second winding of the motor to thereby rotate the motor in a first direction. When, however, the output signal impressed upon the control winding of the A.-C. motor requires a decrease in pressure, there will be a second and opposite phase relationship between the energization of the control winding and the energization of the second motor winding to cause the motor to rotate in a direction opposite from said first direction.

Thus, by utilizing a pressure sensing system and amplifier which are of the A.-C. type and an A.-C. motor, the use of external D.-C. power in the pressure system is substantially eliminated.

As stated above, my novel A.-C. system could be utilized in conjunction with any pressure sensing system so long as the output signal of the pressure sensing system is phase sensitive with respect to increasing and decreasing pressure signals and is used in conjunction with a two-phase A.-C. servo motor.

One typical pressure monitor system will be set forth hereinafter as fulfilling these requirements, although many other pressure monitoring systems could be adapted to work in a substantially identical manner so far as the operation of the control valve is concerned.

This typical pressure monitor system is that set forth in co-pending application Serial No. 647,116, filed and assigned to the assignee of the instant application.

The cabin pressure system set forth in the above-identified application is constructed to maintain an adjustably predetermined cabin pressure within limits given by a maximum differential pressure, this predetermined cabin pressure being achieved at an adjustably predetermined rate of change of cabin pressure which tapers off to zero as the desired cabin pressure is approached.

Three pressure monitoring devices are required in this monitoring system: one for cabin pressure, one for measuring rate of change of cabin pressure, and one for measuring differential pressure. These devices are comprised of diaphragm capsules of well-known construction wherein the cabin pressure diaphragm is evacuated and is directly subjected to the cabin pressure; the rate of change diaphragm has a controlled leak and is subjected to cabin pressure; and the differential pressure diaphragm is internally subjected to flight altitude pressure and externally subjected to cabin pressure.

Each of the diaphragm capsules is then operatively connected to vary the output of an associated inductive pick-off so as to cause an output signal which is proportional to the respective parameter being measured.

By way of example, each of the pressure monitors could include four inductance coils which are connected in bridge relationship and wound on a common magnetic core. The magnetic core is then connected to be moved responsive to a movement of a diaphragm capsule to thereby change the inductance of adjacent inductance coils in the bridge with respect to one another to thereby unbalance the bridge in accordance with the movement of the diaphrgam capsule. Hence, the output voltage of the bridge, which depends on the bridge unbalance, is functionally related to the pressure on the diaphragm capsule.

When using the above-described pressure monitors in this novel cabin pressurization system, the pilot has two controls to set, one for the desired cabin altitude and one for the rate at which the altitude is to be reached.

The altitude monitor element gives a voltage output indicative of the deviation of the cabin altitude from a preset value which corresponds to a balanced condition of the impedance bridge. Clearly, this preset value can be adjusted by adjusting the point at which the bridge is balanced.

The rate of change of pressure monitor has an output voltage which is proportional to the rate of change of cabin altitude, this output being connected in series with and opposed to the output voltage of the altitude monitor.

The differential pressure monitor element provides an output signal in series with the other two elements when the cabin differential pressure exceeds a predetermined value. As will be seen hereinafter, the signal due to the differential pressure element will be large enough to overcome the pressure and pressure rate signals so that exhaust valves may be opened to prevent a dangerously high differential pressure.

The two most frequently encountered situations in cabin pressure control are:

(1) Changing from one cabin altitude to another.
(2) Holding a fixed cabin altitude.

When the airplane is airborne, the outputs of the three monitor elements are arranged in series so that when the cabin altitude differs from, but is approaching, the preset value, the outputs of the rate and altitude monitors are in opposition. As long as the differential pressure remains below its limiting value, the differential pressure monitor does not give a signal. Therefore, when the altitude monitor is producing a signal because the cabin altitude is different from the preset value, a cabin pressure control valve is moved so as to produce enough rate of change of altitude to produce a signal from the rate monitor which is equal and opposite to the altitude signal. When the signals are equal, the valve motion is stopped.

The altitude monitor reaches its maximum output for a small difference from the preset altitude and for any larger errors in cabin altitude, the voltage remains fixed. The rate of change of pressure in the cabin which the valve must produce is dependent on the value of this fixed voltage. Therefore, the rate of change from one altitude to another which is substantially different is determined by adjusting the excitation voltage and therefore the maximum output of the altitude transducer.

When the control system is holding the cabin pressure at a fixed value, the rate and cabin altitude signals combine to give smooth control in a manner similar to that described above.

When the cabin differential pressure reaches its limiting value, the differential pressure monitor element produces an "open valve" signal. The monitor elements are adjusted so that the maximum differential pressure signal will exceed any signal the altitude and rate monitors can produce, and consequently will override their combined signal when the maximum differential pressure is exceeded.

Prior to landing an aircraft equipped with this novel system, it is desirable that the cabin pressure be equalized with the external atmospheric pressure. To this end, the landing gear of the aircraft operates to disconnect the altitude monitor element and cause a fixed "open valve" voltage to be switched into the control circuit upon operation of the landing gear. This would then call for a rate of comfortable cabin depressurization until the cabin pressure reaches the external pressure.

As will be shown more fully hereinafter, the series connected output of the above noted pressure transducers is amplified and then connected to a first winding of a two phase A.-C. motor. The A.-C. motor has a second winding in series with a phase splitting capacitor, this winding being energized from the A.-C. line. If, now, the pressure monitors have an output signal calling for an increase in pressure, the phase of the output signal would be in some predetermined phase relationship with respect to the phase of the second winding and the valve motor will be rotated accordingly towards the closed position.

When, however, the output of the pressure monitors call for a decrease in the cabin pressure, the phase of this signal will be 180° displaced from the phase of the signal requiring an increase. Hence, the energization of the first motor winding will now have a second phase relationship with respect to the phase of the second motor winding and the motor will be rotated in the opposite direction.

Accordingly, an important object of this invention is to provide a novel cabin pressurization system which utilizes A.-C. power only.

Another object of this invention is to provide an exhaust valve motion which is proportional to the combined error signal of three pressure monitors.

Another object of this invention is to provide a novel cabin pressurization system for aircraft which substantially eliminates the need for D.-C. power.

A further object of this invention is to provide a novel cabin pressurization system wherein a two phase A.-C. motor is selectively energized for rotation in a first or second direction by means of the output of the pressure sensing system wherein the pressure monitor elements comprise impedances which are varied responsive to the variation of the diaphragm capsules of the pressure monitors.

In many applications of cabin pressure systems, it is necessary that more than a single exhaust valve be provided. Thus, a first and second exhaust valve may be located at different points within the cabin to discharge exhaust air to the external atmosphere. It is further desirable that the operation of the exhaust valve be controlled with respect to one another wherein one valve could be made to exhaust at the same rate or a specified amount faster or slower than the second to obtain the most comfortable conditions within the cabin.

It is a further important object of this invention to couple a master control valve to a slave valve by means of an electrical servo system which will afford easy adjustment of the valves with respect to one another. That is, the butterflies of the master and slave valves are synchronized to achieve the best balance in the flow of the two control valves.

This is accomplished by coupling a signal generator to the master valve butterfly which transmits a signal representative of its position from a given reference. This signal is transmitted to a control transformer of the slave valve butterfly and an error signal resulting from misalignment between the two butterflies is amplified, added to the signal used to control the master valve, and used to drive a control motor on the slave valve, which in turn will drive the rotor of its control transformer to a null.

In this manner, synchronization of the two butterflies can be held very closely and their relative positions can be adjusted by simply rotating the stator of the signal generator, the difference in adjusted position being maintained during operation. Furthermore, should the synchronizing amplifier fail, both valves will function to maintain the correct cabin pressure, but they will not be synchronized to properly divide the airflow at all times.

Accordingly, another important object of this invention is to provide a novel system for synchronizing the operation of a plurality of control valves which is easily adjustable and eliminates the need for mechanical interconnections.

Still another object of this invention is to operate a slave exhaust valve from the master exhaust valve by means of a servo system.

Still another object of this invention is to allow easy control of balance in the flow of two control valves by synchronizing their operation with a servo system and thereby afford easy adjustment of the position of one valve with respect to the position of the other.

These and other objects of this invention will become apparent from the following description when taken in connection with the drawings, in which:

Figure 4b shows a connection diagram for the windings of Figure 4a.

Figure 5 shows a complete circuit diagram of the novel system of this invention.

Figure 1:
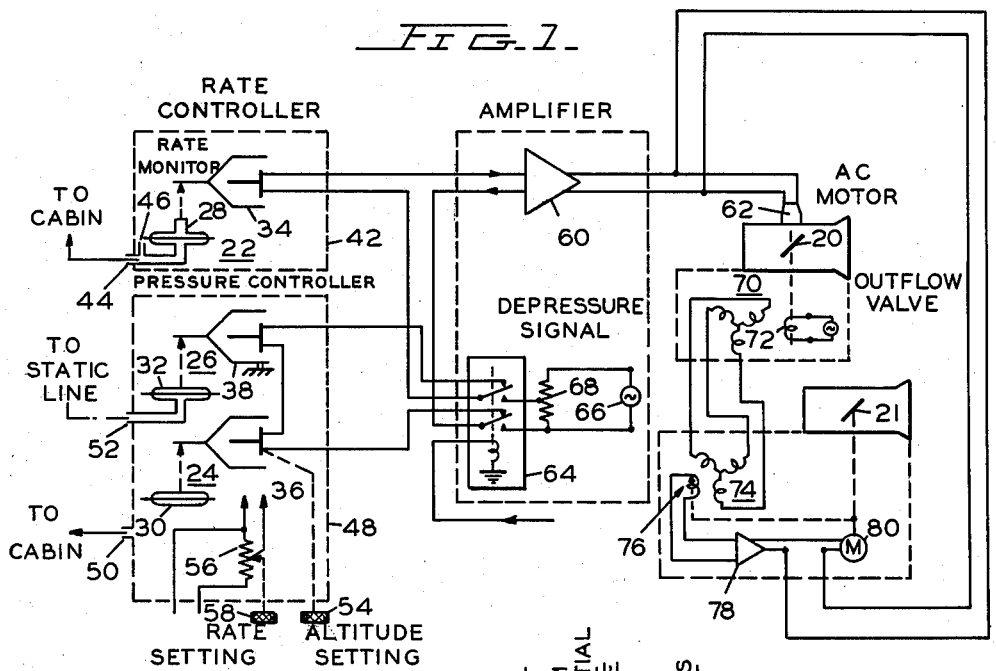
Figure 1 is a function schematic diagram which shows the novel A.-C. power operation pressurization system of this invention.

The principle of this novel pressurization system may be schematically seen in Figure 1 wherein master valve 20 and slave valve 21 are the exhaust valves of a pressurized cabin which is to be controlled in accordance with the pressure conditions measured by rate of change of pressure monitor 22, cabin pressure monitor 24, and differential pressure monitor 26.

Each of the pressure monitors is connected to an A.-C. input and their construction will be described more fully hereinafter. Each of pressure monitors 22, 24 and 26 is activated by a diaphragm capsule 28, 30 and 32, respectively, which by controlling an impedance element controls the output of devices 34, 36 and 38, respectively.

The rate of change of cabin pressure monitor 22 is positioned within a housing 42 and the interior of diaphragm 28 is subjected to cabin pressure over line 44. The line 44 is further provided with a controlled leak 46, and the diaphragm will then, as well known in the art, position itself in accordance with the rate of change of the cabin pressure. The electrical output of device 34 which is varied by diaphragm capsule 28 is, therefore, a function of the rate of change of cabin pressure.

Both the differential pressure monitor 26 and altitude monitor 24 are positioned within box 48, the interior of which is connected to the cabin pressure over line 50 with the interior of diaphragm 30 being evacuated while the interior of diaphragm 32 is connected to the flight altitude pressure over line 52.

Thus, the diaphragm 32 is positioned in accordance with the pressure difference between the cabin air pressure and the flight or external pressure, and since the impedance of device 38 is controlled by diaphragm 32, the electrical output of device 38 depends on the pressure differential.

Figure 2:
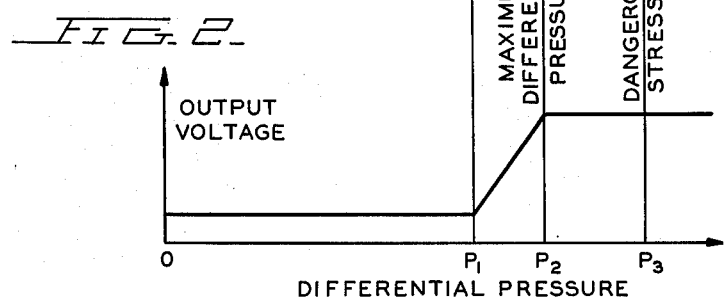
Figure 2 shows a curve of output voltage as a function of differential pressure for the differential pressure monitor.

It is desirable that the output of differential pressure monitor 26 be similar to that shown in Figure 2, this characteristic being relatively easy to obtain with judicious circuit design.

In Figure 2, it is seen that at point $P_1$, when the differential pressure approaches too high a value, a signal is initiated by the differential pressure monitor which, as will be seen in Figure 1, will cause the outflow valve to move to relieve this pressure difference. As the differential pressure continues to increase, a correspondingly stronger signal is obtained from the differential pressure monitor until at $P_2$ or the maximum permissible differential below the point $P_3$ at which the air frame will be dangerously stressed, the signal achieves a maximum.

As heretofore mentioned, diaphragm 30 is subjected only to cabin pressure and its diaphragm will vary accordingly. Hence, the output voltage of device 36 is constructed to be varied by diaphragm 30 is a function of cabin pressure.

As will be seen more fully hereinafter, device 36 is of the adjustable type wherein the output depends on the degree of unbalance. In order to adjust the cabin pressure to a predetermined altitude, a knob 54 is connected to vary the balance point or zero output point of device 36.

The input voltage to device 36 is controlled by potentiometer 56, which is adjusted by knob 58. As will be presently seen, the adjustment of the input voltage to device 36 by knob 58 determines the maximum rate of change of cabin voltage.

During normal automatic operating condition, the outputs of altitude monitor 36 and rate of pressure monitor 34 are connected in opposing relationship with one another, the net signal being impressed upon amplifier 60. The output voltage of amplifier 60 then controls A.-C. motor 62 which in turn positions valve 20.

As will be shown more fully hereinafter, the phase of the input signal to amplifier 60 and the phase of its output signal is reversible when the net input signal is reversed. Thus, when the pressure of the cabin is to be increased, the signal will have one phase, but when the pressure is to be decreased, the phase of the signal reverses.

The motor 62 will then have its direction of rotation controlled in accordance with the phase of the signal and can therefore either close or open valve 20 as required.

When changing from one altitude setting to another by varying knob 54, the balance device 36 is changed and there is an output voltage from device 36. It is to be noted that device 36 can be constructed so that its output is at a maximum for a small deviation from the predetermined pressure. Thus, as seen in Figure 3 at time $t_0$, the cabin altitude is changed from $A_1$ to $A_2$.

Figure 3:
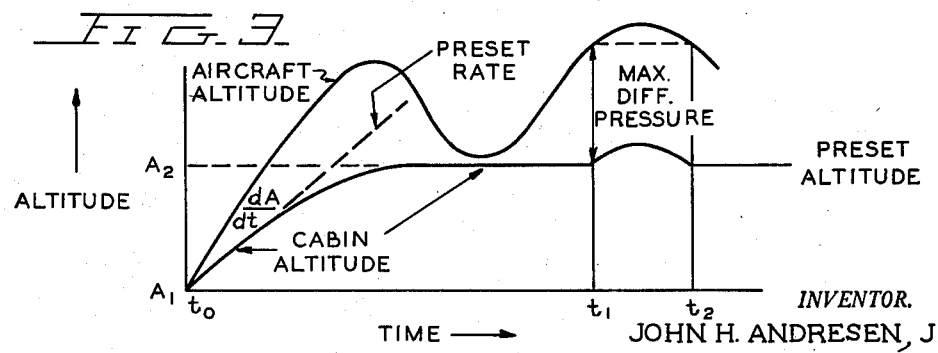
Figure 3 shows a curve of altitude as a function of time for the system of Figure 1.

The output voltage of device 36 is now impressed on amplifier 60 with a given phase relation and operates to vary valve 20 which in turn varies the cabin pressure. Because of the change in cabin pressure, there will be a proportional output from device 34 which is equal and opposite the maximum output signal of device 36, the maximum rate of change of cabin pressure being dependent upon the maximum output voltage of device 36. This, however, depends on the input voltage which is controlled by potentiometer 56. Adjustment of potentiometer 56 by knob 58 will therefore set the maximum rate of change of pressure or the slope $$\frac{dA}{d_t}$$

of Figure 3.

As the cabin pressure approaches its predetermined value, the unbalance of device 36 of Figure 1 will decrease and its output voltage will decrease accordingly. Hence, the position of valve 20 will be altered until the output of device 34 is decreased accordingly.

This operation will then proceed and, as seen in Figure 3, the cabin pressure will smoothly approach the new altitude setting $A_2$.

Further reference to Figure 3 shows that the cabin pressure is maintained relatively constant even though the flight altitude varies. Clearly, the cabin pressure is maintained at this constant value by the coordinated operation of devices 34 and 36 in a manner similar to that set forth above wherein the valve 20 is opened or closed according to the phase of the net signal.

Since it is desirable to equalize cabin pressure and flight pressure prior to landing, relay 64 is operated responsive to operation of the landing gear whereby a fraction of voltage source 66 in series with device 34 is connected to amplifier 60 to operate valve 20 and allow depressurization to proceed at some comfortable rate determined by the open valve voltage source 66 and voltage divider 68.

As heretofore mentioned, it is necessary when the cabin is equipped with more than one exhaust valve to couple the valves together so that their operation may be synchronized. This coupling has been by mechanical means in the past and, therefore, has made coupling and adjustment between the two valves a complicated procedure. The novel system of this invention utilizes a servo system connection which eliminates the above disadvantages.

This servo system is seen in Figure 1 and comprises a signal generator 70 whose rotor 72 is energized from an A.-C. source and is rotatable with the master valve butterfly 20. This signal is transmitted to control transformer 74, the rotor 76 of which is geared to slave butterfly 21. Rotor 76 of control transformer 74 is then positioned in accordance with the positioning of rotor 72.

So long as rotors 72 and 76 are not aligned, a potential will appear across rotor 76. This signal is amplified by amplifier 78 and together with the output of amplifier 60 drives motor 80 which in turn positions slave valve butterfly 21. By connecting rotor 76 to be rotated with this valve 21, it is clear that the error signal will be produced so long as there is a misalignment between the two butterfly valves 20 and 21, which error signal will ultimately position the valves in synchronism with one another. Note that even if amplifier 78 should fail, both valves will still function off the master valve amplifier although not necessarily in complete synchronism. If it is desired now to adjust the position of valve 21 with respect to the position of valve 20, it is merely necessary to rotate the stator of the signal generator 70.

Clearly, if more than one slave valve is required in a given cabin pressure system, the other valves may be controlled in a manner identical to that set forth in Figure 1 for valve 21.

Figure 4:
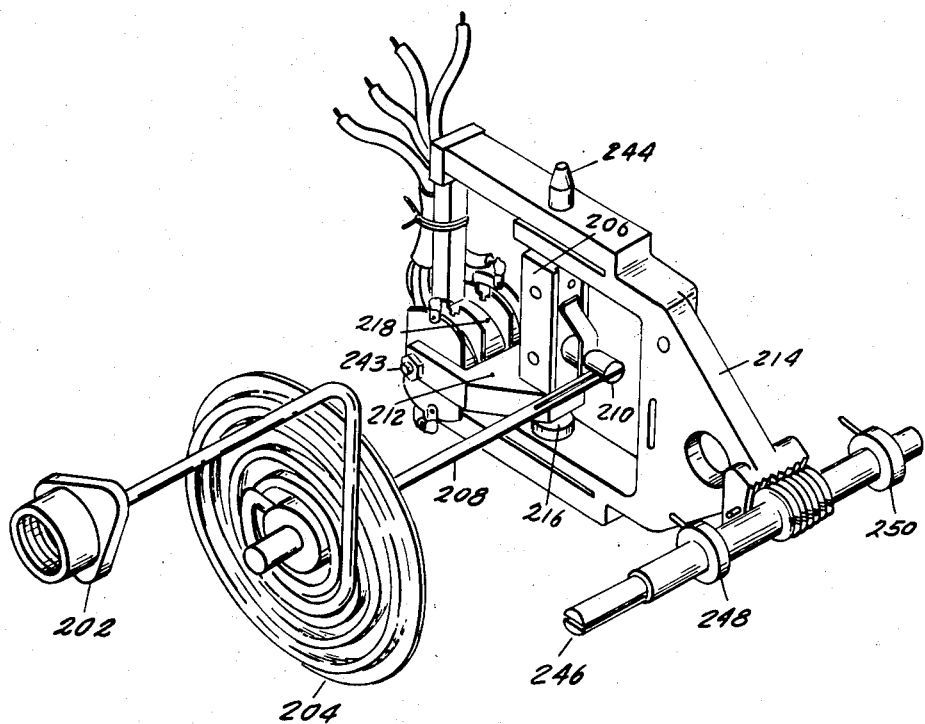
Figure 4 shows a perspective view of a pressure monitor element which can be used in conjunction with this invention.
Figure 4A:
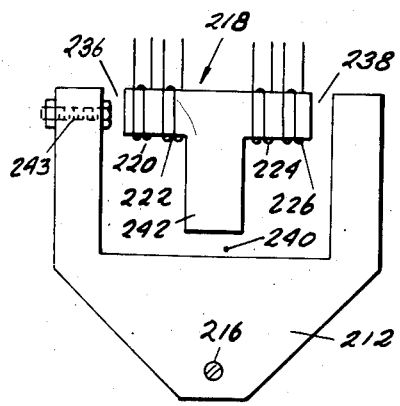
Figure 4a shows a top cross-sectional view taken through the armature of Figure 4.

The construction of the pressure monitors such as monitors 22, 24 and 26 of Figure 1 is set forth in Figures 4 and 4a wherein Figure 4a is a sectional view taken through the armature and field members of the perspective view of Figure 4 for the case of a differential pressure monitor.

Referring first to Figure 4, a pressure fitting 202 feeds one pressure to the inside of the diaphragm 204. A second pressure, which is the pressure inside the case housing the device of Figure 4 acts on the outside of diaphragm 204.

Clearly, in an altitude monitor, diaphragm 204 will be evacuated and the pressure is fed to the inside of the instrument case to act on the outside of diaphragm 204 while in a rate monitor, a diaphragm with a controlled leak is used as was described hereinbefore and the pressure is fed to the case.

The diaphragm 204 is attached to the rocking shaft 206 by means of link 208 and calibrating arm 210. If desired, link 208 may be attached to a temperature compensator (not shown) on either the diaphragm center piece or the rocking shaft 206.

The rocking shaft 206 is directly connected to armature structure 212 (see Figure 4a) which is pivotally mounted on the yoke 214 at the pivotal mounting structure 216.

Thus, as the pressure applied to diaphragm 204 varies, the diaphragm expands or contracts to rotate the rocking shaft 206 and C-shaped armature 212 with respect to the yoke 214.

A field structure 218 is then mounted on the yoke 214 and, as best seen in Figure 4a comprises a T-shaped magnetic structure nested within the C-shaped armature 212. The two upper legs of the T of field structure 218 then have two windings 220, 222, and 224, 226 respectively wound thereon, as shown in Figure 4a, these windings being connected as shown in Figure 4b to form a bridge circuit having input terminals 228 and 230 and output terminals 232 and 234.

In view of this novel structure, the inductance of coils 220 and 222 may be varied with respect to the inductance of coils 224 and 226 by varying the angular position of armature 212 with respect to the field structure 218 to thereby change the airgaps 236 and 238 of Figure 4a and thus change the reluctance of their respective magnetic circuits.

Thus, in one embodiment of this invention, the air gaps 236 and 238 are large with respect to air gap 240 whereby the magnetic circuit of each pair of coils will have a relatively large amount of flux passing through the center leg 242 of field structure 218. When, however, structure 212 is rotated about pivot point 216 with respect to field structure 218, one of the air gaps 236 or 238 will increase while the other decreases whereby the inductance of one pair of coils will decrease and the inductance of the other pair will increase respectively. This rotation can, if desired, be limited by adjustable stops such as adjustable stop 243 of Figures 4 and 4a.

Figure 4B:
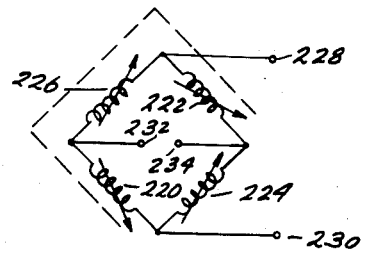

Hence, the bridge circuit of Figure 4b will be unbalanced by a variation of pressure applied to diaphragm 204 to a degree depending on the magnitude of variation of the diaphragm dimensions.

In order to allow initial adjustment of the bridge of Figure 4b the yoke 214 of Figure 4 is pivotally mounted at pivot 244 which is coaxial with pivot 216 and the yoke is threadably engaged by an adjustable setting shaft 246. The adjustable setting shaft 246 is manually operable and includes the non-jamming stops 248 and 250 which limit its motion. In operation, rotation of shaft 246 will cause an angular displacement between the field structure 218 carried by the yoke and the armature structure 212 which is maintained in its angular position through the link 208 and rocking shaft 206.

In the rate monitor, the shaft 246 is adjusted at assembly to have the bridge give a null output for zero vertical speed. The voltage output thereafter is due solely to the motion of the diaphragm 204 and the armature 212.

It is to be noted that link 208 is slotted to permit the diaphragm 204 to continue to move after the field structure engages a stop means such as stop means 243. Furthermore, backlash in the mechanism may be taken up by a series of coil springs (not shown) while an adjustable counter weight balances the movable parts.

Figure 5 shows a complete circuit diagram for connecting pressure monitors of the type shown in Figure 4 to pressure control valves in the manner described in conjunction with the functional schematic diagram of Figure 1.

More specifically, a master valve butterfly 82 and a slave valve butterfly 84 are positioned to control the air pressure within a pressurized cabin, the external surface of which is fragmentarily shown as surfaces 86 and 88 respectively.

The position of slave valve butterfly 84 is controlled by means of a servo system operated from control valve 82 and the main amplifier output, as was seen in Figure 1. The position of master valve butterfly 82 is controlled by the motor 90 which is a two phase induction motor having a first winding 92 and a second winding 94. Winding 94 is connected to the A.-C. source 96 through the phase splitting capacitor 98 so that the phasing of winding 94 is constant. Winding 92, however, is energized from the secondary of autotransformer 100 having a center tap connected to the ground side of A.-C. source 96.

In order to protect the gear train between the motor and butterfly in full open and full closed position, the increase and decrease limit switches are operated to open circuit autotransformer 100.

As will be presently seen, the primary winding of autotransformer 100 may be energized in accordance with a first and second phase relationship with respect to winding 94. This energization is more specifically the output of amplifier 102 which will have one phase relationship when the cabin pressure is to be increased and an opposite phase relationship when the cabin pressure is to be decreased. This phase relationship will then be impressed upon the motor winding 92 and depending upon the relationship between the phase of the voltage appearing across winding 92, and the phase of the voltage appearing across 94, the motor will rotate either to open or to close master valve butterfly 82.

For manual operation of motor 90 and hence the cabin pressure system, the four position switch 104 is moved to a disconnect position to thereby disconnect the A.-C. source 96 from the automatic pressure control components which will be described hereinafter. In order to increase the cabin pressure manually, four position switch 104 is connected to the contact labeled "increase" to thereby connect A.-C. source 96 directly across the lower half of the primary winding of autotransformer 100. By so completing this connection, the phase relationship between windings 92 and 94 will be such that the motor 90 will rotate in a direction to close butterfly valve 82.

In a similar manner, if it is desired to manually decrease the cabin pressure, the four position switch 104 is connected to the contact labeled "decrease" whereupon voltage source 96 is connected across the upper half of the winding of autotransformer 100, thus reversing the phase relationship between windings 92 and 94 that had existed when it was intended to increase cabin pressure.

Because of this phase reversal, the motor will now rotate in a direction opposite to its direction of rotation for increasing cabin pressure to open the butterfly valve 82 and allow the desired decrease of cabin pressurization to take place.

It is to be noted at this point that switch 104 is of the type that will be normally disengaged from either the increase contact or the decrease contact and upon release of the manual engagement between these components, the switch will assume a disconnected position.

However, the switch will remain in position continuously when once thrown to either the automatic or disconnected position.

When the valve butterfly 82 is moved, it is possible to operate a slave valve butterfly 84 in a similar manner wherein the interconnection between butterfly 82 and 84 is through a servo system so as to allow easy connection there between and an easily made adjustment of their relative positions. The servo system set forth in Figure 5 for connecting butterflies 82 and 84 is substantially identical with that of Figure 1 and in the case of Figure 5 is comprised of the signal generator 106 whose rotor 108 is positioned by valve 82 and is energized from A.-C. source 109.

The output of signal generator 106 is then connected to a control transformer 110 which has a rotor 112. Rotor 112 is mechanically ocnnected to rotate with slave valve butterfly 84 which is positioned by the servomotor 114. So long as the two butterfly valves 82 and 84 are misaligned, an error signal will appear across rotor 112 and will be amplified in amplifier 116 to control the operation of motor 114 together with signal from winding 92 in such a manner that butterfly 84 is quickly brought into alignment with butterfly 82.

Clearly this synchronization between valves 82 and 84 may be easily adjusted by merely rotating the stator of signal generator 106 in a manner well known in the art.

It is understood that the synchronization between butterflies 82 and 84 will proceed regardless of whether the cabin pressurization system is being operated manually or automatically.

Automatic operation of this novel system is initiated when switch 104 is connected to the contact labelled "Automatic." During automatic operation, the rate monitor 118, the altitude monitor 120 and the differential pressure monitor 122 control the operation of motor 90 through the selective phase energization of winding 92. Clearly, pressure monitors 118, 120 and 122 are of the type described hereinabove, each comprising an impedance bridge circuit which is balanced or unbalanced in accordance with the parameter being measured.

The inputs of each of monitors 118, 120 and 122 are taken from secondary windings 124, 126 and 128 respectively of the transformer 130. The primary winding 132 of transformer 130 is energized from A.-C. source 96 upon positioning of switch 104 in the automatic position. The outputs of the monitoring elements 118, 120 and 122 are then connected in series through the relay contacts 134 and 136 and the net output is impressed upon the input of amplifier 102 at the input leads 138 and 140. A.-C. power for the operation of amplifier 102 is taken from source 96 over the wires 142 and 144 and the output of amplifier 102 is taken over the wires 146 and 148 through terminals C and D respectively, and then across the complete winding of auto transformer 100.

When the net output of all of the pressure sensing elements indicates that the cabin pressure is too low and has to be increased, then the input signal to amplifier 102 is such that the amplified output signal will have the proper phase such that the phase relationship between windings 92 and 94 of motor 90 will rotate the motor in a direction which will cause valve 82 and hence valve 84 to close, thereby increasing cabin pressure.

If on the other hand, the cabin pressure is to be decreased, the polarity of the error signal impressed upon amplifier 102 will be reversed, the output signal across lines 146 and 148 will be reversed and hence there will be a phase reversal between the voltages appearing across windings 92 and 94 of motor 90. This phase reversal will then cause the motor 90 to rotate in a direction opposite to that above and accordingly, the valves 82 and 84 will be opened to allow the required decrease in cabin pressure.

It is to be noted that the input voltage to altitude monitor element 120 is controlled by the rate setting potentiometer 150 which will control the maximum rate of change of pressure which may take place within the cabin as has been described heretofore.

In the event that a predetermined pressure differential is exceeded, then, as has been set forth in conjunction with Figures 2 and 3, the output signal of the differential pressure monitor element will control the net output signal so that the valves 82 and 84 are altered to reduce the pressure differential.

For landing gear operation of valves 82 and 84, the altitude and differential pressure transducers 120 and 122 may be switched out of the circuit and a fixed "open valve" voltage is switched in its place. This "open valve" voltage is the voltage appearing across resistor 152. The sum of the "open valve" plus rate voltage is impressed upon the amplifier input leads 138 and 140 upon energization of relay coil 154 to connect the movable contacts of the relay to stationary contacts 156 and 158.

Although I have described preferred embodiments of my novel invention, many variations and modifications will now be obvious to those skilled in the art, and I prefer therefore to be limited not by the specific disclosure herein but only by the appended claims.

I claim:

1. In a cabin pressurization system comprising a pressurized cabin, means for forcing air into said cabin and exhaust valve means communicating between the interior and exterior of said cabin and controlling the exhaust of air therefrom; a first transducer device including means responsive to cabin pressure and having an output A.-C. voltage continuously related to cabin pressure, a second transducer device including means responsive to rate of change of cabin pressure and having an output A.-C. voltage continuously related to rate of change of cabin pressure, and a reversible A.-C. motor constructed to rotate in a first direction responsive to a first phase energization and in a second direction responsive to a second phase energization; said A.-C. motor being operatively connected to said exhaust valve means to move said exhaust valve toward a more open position or more closed position responsive to rotation of said A.-C. reversible motor in said first or second direction respectively; said first and second transducer output voltages being connected in series opposition and in series with said reversible A.-C. motor, the combined outputs of said voltages energizing said A.-C. reversible motor in said first phase relationship when cabin pressure is too high and in said second phase relationship when cabin pressure is too low.

2. In a cabin pressurization system comprising a pressurized cabin, means for forcing air into said cabin and exhaust valve means communicating between the interior and exterior of said cabin and controlling the exhaust of air therefrom; a first transducer device including means responsive to cabin pressure and having an output A.-C. voltage continuously related to cabin pressure, a second transducer device including means responsive to rate of change of cabin pressure and having an output A.-C. voltage continuously related to rate of change of cabin pressure, and a reversible A.-C. motor constructed to rotate in a first direction responsive to a first phase energization and in a second direction responsive to a second phase energization; said A.-C. motor being operatively connected to said exhaust valve means to move said exhaust valve toward a more open position or more closed position responsive to rotation of said A.-C. reversible motor in said first or second direction respectively; said first and second transducer output voltages being connected in series opposition and in series with said reversible A.-C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively.

3. In a cabin pressurization system comprising a pressurized cabin, means for forcing air into said cabin and exhaust valve means communicating between the interior and exterior of said cabin and controlling the exhaust of air therefrom; a first transducer device including means responsive to cabin pressure and having an output A.-C. voltage continuously related to cabin pressure, a second transducer device including means responsive to rate of change of cabin pressure and having an output A.-C. voltage continuously related to rate of change of cabin pressure, a third transducer device including means responsive to the difference in pressure between the interior of said cabin and the external atmosphere and having an output voltage related to the difference in pressure between the interior of said cabin and the external atmosphere, and a reversible A.-C. motor constructed to rotate in a first direction responsive to a first phase energization and in a second direction responsive to a second phase energization; said A.-C. motor being operatively connected to said exhaust valve means to move said exhaust valve toward a more open position or more closed position responsive to rotation of said A.-C. reversible motor in said first or second direction respectively; and circuit means for connecting said first and second transducer output voltages to said A.-C. reversible motor to energize said reversible motor in said first phase energization when cabin pressure is to be decreased and in said second phase energization when cabin pressure is to be increased; said third transducer being connected to said A.-C. reversible motor to energize said motor at said second phase energization regardless of operation of said first and second transducers when said pressure differential exceeds a predetermined value.

4. In a cabin pressurization system comprising a pressurized cabin, means for forcing air into said cabin and exhaust valve means communicating between the interior and exterior of said cabin and controlling the exhaust of air therefrom; a first transducer device including means responsive to cabin pressure and having an output A.-C. voltage continuously related to cabin pressure, a second transducer device including means responsive to rate of change of cabin pressure and having an output A.-C. voltage continuously related to rate of change of cabin pressure, a third transducer device including means responsive to the difference in pressure between the interior of said cabin and the external atmosphere and having an output voltage related to the difference in pressure between the interior of said cabin and the external atmosphere; and a reversible A.-C. motor constructed to rotate in a first direction responsive to a first phase energization and in a second direction responsive to a second phase energization; said A.-C. motor being operatively connected to said exhaust valve means to move said exhaust valve toward a more open position or more closed position responsive to rotation of said A.-C. reversible motor in said first or second direction respectively; said first and second transducer output voltages being connected in series opposition and in series with said reversible A.-C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively; said third transducer being connected to said A.-C. reversible motor to energize said motor at said second phase energization regardless of operation of said first and second transducers when said pressure differential exceeds a predetermined value.

5. In a cabin pressurization system comprising a pressurized cabin, means for forcing air into said cabin and exhaust valve means communicating between the interior and exterior of said cabin and controlling the exhaust of air therefrom; a first transducer device including means responsive to cabin pressure and having an output A.-C. voltage continuously related to cabin pressure, a second transducer device including means responsive to rate of change of cabin pressure and having an output A.-C. voltage continuously related to rate of change of cabin pressure, and a reversible A.-C. motor constructed to rotate in a first direction responsive to a first phase energization and in a second direction responsive to a second phase energization; said A.-C. motor being operatively connected to said exhaust valve means to move said exhaust valve toward a more open position or more closed position responsive to rotation of said A.-C. reversible motor in said first or second direction respectively; said first and second transducer output voltages being connected in series opposition and in series with said reversible A.-C. motor, the combined outputs of said voltages energizing said A.-C. reversible motor in said first phase relationship when cabin pressure is too high and in said second phase relationship when cabin pressure is too low; said first transducer having a maximum output voltage determining the maximum rate of change of cabin pressure, and means for adjusting said maximum output voltage of said second transducer means for adjusting the maximum rate of change of cabin pressure.

6. In a cabin pressurization system comprising a pressurized cabin, means for forcing air into said cabin and exhaust valve means communicating between the interior and exterior of said cabin and controlling the exhaust of air therefrom; a first transducer device including means responsive to cabin pressure and having an output A.-C. voltage continuously related to cabin pressure, a second transducer device including means responsive to rate of change of cabin pressure and having an output A.-C. voltage continuously related to rate of change of cabin pressure, a third transducer device including means responsive to the difference in pressure between the interior of said cabin and the external atmosphere and having an output voltage related to the difference in pressure between the interior of said cabin and the external atmosphere; and a reversible A.-C. motor constructed to rotate in a first direction responsive to a first phase energization and in a second direction responsive to a second phase energization; said A.-C. motor being operatively connected to said exhaust valve means to move said exhaust valve toward a more open position or more closed position responsive to rotation of said A.-C. reversible motor in said first or second direction respectively; said first and second transducer output voltages being connected in series opposition and in series with said reversible A.-C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively; said third transducer being connected to said A.-C. reversible motor to energize said motor at said second phase energization regardless of operation of said first and second transducers when said pressure differential exceeds a predetermined value; said first transducer having a maximum output voltage determining the maximum rate of change of cabin presure, and means for adjusting said maximum output voltage of said second transducer means for adjusting the maximum rate of change of cabin pressure.

7. In a cabin pressurization system comprising a pressurized cabin, means for forcing air into said cabin and exhaust valve means communicating between the interior and exterior of said cabin and controlling the exhaust of air therefrom; a first transducer device including means responsive to cabin pressure and having an output A.-C. voltage continuously related to cabin pressure, a second transducer device including means responsive to rate of change of cabin pressure and having an output A.-C. voltage continuously related to rate of change of cabin pressure, and a reversible A.-C. motor constructed to rotate in a first direction responsive to a first phase energization and in a second direction responsive to a second phase energization; said A.-C. motor being operatively connected to said exhaust valve means to move said exhaust valve toward a more open position or more closed position responsive to rotation of said A.-C. reversible motor in said first or second direction respectively; said first and second transducer output voltages being connected in series opposition and in series with said reversible A.-C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively; said cabin pressure being normally maintained at a value yielding a zero output voltage for said first transducer, said normal cabin pressure level being adjusted by adjusting said transducer zero voltage output point.

8. In a cabin pressurization system comprising a pressurized cabin, means for forcing air into said cabin and exhaust valve means communicating between the interior and exterior of said cabin and controlling the exhaust of air therefrom; a first transducer device including means responsive to cabin pressure and having an output A.-C. voltage continuously related to cabin pressure, a second transducer device including means responsive to rate of change of cabin pressure and having an output A.-C. voltage continuously related to rate of change of cabin pressure, and a reversible A.-C. motor constructed to rotate in a first direction responsive to a first phase energization and in a second direction responsive to a second phase energization; said A.-C. motor being operatively connected to said exhaust valve means to move said exhaust valve toward a more open position or more closed position responsive to rotation of said A.-C. reversible motor in said first or second direction respectively; said first and second transducer output voltages being connected in series opposition and in series with said reversible A.-C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively; said cabin pressure being normally maintained at a value yielding a zero output voltage for said first transducer, said normal cabin pressure level being adjusted by adjusting said transducer zero voltage output point; said first transducer having a maximum output voltage determining the maximum rate of change of cabin pressure, and means for adjusting said maximum output voltage of said second transducer means for adjusting the maximum rate of change of cabin pressure.

9. In a cabin pressurization system comprising a pressurized cabin, means for forcing air into said cabin and exhaust valve means communicating between the interior and exterior of said cabin and controlling the exhaust of air therefrom; a first transducer device including means responsive to cabin pressure and having an output A.-C. voltage continuously related to cabin pressure, a second transducer device including means responsive to rate of change of cabin pressure and having an output A.-C. voltage continuously related to rate of change of cabin pressure, and a reversible A.-C. motor constructed to rotate in a first direction responsive to a first phase energization and in a second direction responsive to a second phase energization; said A.-C. motor being operatively connected to said exhaust valve means to move said exhaust valve toward a more open position or more closed position responsive to rotation of said A.-C. reversible motor in said first or second direction respectively; said first and second transducer output voltages being connected in series opposition and in series with said reversible A.-C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively; said cabin pressure being normally maintained at a value yielding a zero output voltage for said first transducer, said normal cabin pressure level being adjusted by adjusting said transducer zero voltage output point; said first transducer having a maximum output voltage determining the maximum rate of change of cabin presure, and means for adjusting said maximum output voltage of said second transducer means for adjusting the maximum rate of change of cabin pressure; a change in cabin pressure from a first normal value to a second normal value due to a change in said zero voltage output point of said first transducer being achieved by a rate of change of cabin pressure having its maximum value limited by said maximum output voltage of said first transducer and tapering off to zero as said second normal value of cabin pressure is achieved.

10. A valve control system for controlling a pressure control valve comprising an A.C. motor energizable for rotation in a first or second direction responsive to first or second respective input signals phase displaced from one another by 180°, a first pressure measuring device including means responsive to pressure and having an output voltage continuously related to pressure and a second pressure measuring device including means responsive to rate of pressure change having an output voltage continuously related to rate of pressure change; said A.C. motor being operatively connected to said valve to move said valve toward more open and more closed positions responsive to rotation in said first or second directions, respectively, circuit connections for combining the output voltages of said first and second pressure measuring devices and forming said input signal for said A.C. motor; said input signal having said first phase relationship when the output voltage of said first pressure measuring device has a first magnitude with respect to the output voltage of said second measuring device and a second phase relationship when the output voltage of said first measuring device has a second magnitude with respect to the output voltage of said second measuring device.

11. A valve control system for controlling a pressure control valve comprising an A.C. motor energizable for rotation in a first or second direction responsive to first or second respective input signals phase displaced from one another by 180°, a first pressure measuring device including means responsive to pressure and having an output voltage continuously related to pressure and a second pressure measuring device including means responsive to rate of pressure change having an output voltage continuously related to rate of pressure change; said A.C. motor being operatively connected to said valve to move said valve toward more open and more closed positions responsive to rotation in said first or second directions, respectively, circuit connections for combining the output voltages of said first and second pressure measuring devices and for said input signal for said A.C. motor; said input signal having said first phase relationship when the output voltage of said first pressure measuring device has a first magnitude with respect to the output voltage of said second measuring device and a second phase relationship when the output voltage of said first measuring device has a second magnitude with respect to the output voltage of said second measuring device; said A.C. motor having a first and second winding, said first winding being energized from a fixed phase A.C. source, said second winding having said input signal applied thereto; the direction of rotation of said motor being reversed when the phase relationship between the A.C. voltage applied to said first and second windings is reversed.

12. In a cabin pressurization system comprising a pressurized cabin, means for forcing air into said cabin and a first and second exhaust valve means communicating between the interior and exterior of said cabin and controlling the exhaust of air therefrom; a first transducer device including means responsive to cabin pressure and having an output A.C. voltage related to cabin pressure, a second transducer device including means responsive to rate of change of cabin pressure and having an output A.C. voltage related to rate of change of cabin pressure, and a reversible A.C. motor constructed to rotate in a first direction responsive to a first phase energization and in a second direction responsive to a second phase energization; said A.C. motor being operatively connected to said first exhaust valve means to move said first exhaust valve toward a more open position or more closed position responsive to rotation of said A.C. reversible motor in said first or second direction respectively; and circuit means for connecting said first and second transducer output voltages to said A.C. reversible motor to energize said reversible motor in said first phase energization when cabin pressure is to be decreased and in said second phase energization when cabin pressure is to be increased; and electrical A.C. servo means interconnecting said first and second exhaust valves; said servo means positioning said second exhaust valve in accordance with the positioning of said first exhaust valve.

13. In a cabin pressurization system comprising a pressurized cabin, means for forcing air into said cabin and a first and second exhaust valve means communicating between the interior and exterior of said cabin and controlling the exhaust of air therefrom; a first transducer device including means responsive to cabin pressure and having an output A.C. voltage related to cabin pressure, a second transducer device including means responsive to rate of change of cabin pressure and having an output A.C. voltage related to rate of change of cabin pressure, and a reversible A.C. motor constructed to rotate in a first direction responsive to a first phase energization and in a second direction responsive to a second phase energization; said A.C. motor being operatively connected to said first exhaust valve means to move said first exhaust valve toward a more open position or more closed position responsive to rotation of said A.C. reversible motor in said first or second direction respectively; said first and second transducer output voltages being connected in series opposition and in series with said reversible A.C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively; and electrical A.C. servo means interconnecting said first and second exhaust valves; said servo means positioning said second exhaust valve in accordance with the positioning of said first exhaust valve.

14. In a cabin pressurization system comprising a pressurized cabin, means for forcing air into said cabin and a first and second exhaust valve means communicating between the interior and exterior of said cabin and controlling the exhaust of air therefrom; a first transducer device including means responsive to cabin pressure and having an output A.C. voltage related to cabin pressure, a second transducer device including means responsive to rate of change of cabin pressure and having an output A.C. voltage related to rate of change of cabin pressure, a third transducer device including means responsive to the difference in pressure between the interior of said cabin and the external atmosphere and having an output voltage related to the difference in pressure between the interior of said cabin and the external atmosphere, and a reversible A.C. motor constructed to rotate in a first direction responsive to a first phase energization and in a second direction responsive to a second phase energization; said A.C. motor being operatively connected to said first exhaust valve means to move said first exhaust valve toward a more open position or more closed position responsive to rotation of said A.C. reversible motor in said first or second direction respectively; and circuit means for connecting said first and second transducer output voltages to said A.C. reversible motor to energize said reversible motor in said first phase energization when cabin pressure is to be decreased and in said second phase energization when cabin pressure is to be increased; said third transducer being connected to said A.C. reversible motor to energize said motor at said second phase energization regardless of operation of said first and second transducers when said pressure differential exceeds a predetermined value; and electrical A.C. servo means interconnecting said first and second exhaust valves; said servo means positioning said second exhaust valve in accordance with the positioning of said first exhaust valve.

15. In a cabin pressurization system comprising a pressurized cabin, means for forcing air into said cabin and a first and second exhaust valve means communicating between the interior and exterior of said cabin and controlling the exhaust of air therefrom; a first transducer device including means responsive to cabin pressure and having an output A.C. voltage related to cabin pressure, a second transducer device including means responsive to rate of change of cabin pressure and having an output A.C. voltage related to rate of change of cabin pressure, and a reversible A.C. motor constructed to rotate in a first direction responsive to a first phase energization and in a second direction responsive to a second phase energization; said A.C. motor being operatively connected to said first exhaust valve means to move said first exhaust valve toward a more open position or more closed position responsive to rotation of said A.C. reversible motor in said first or second direction respectively; said first and second transducer output voltages being connected in series opposition and in series with said reversible A.C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively; said cabin pressure being normally maintained at a value yielding a zero output voltage for said first transducer, said normal cabin pressure level being adjusted by adjusting said transducer zero voltage output point; said first transducer having a maximum output voltage determining the maximum rate of change of cabin pressure and means for adjusting said maximum output voltage of said second transducer means for adjusting the maximum rate of change of cabin pressure; a change in cabin pressure from a first normal value to a second normal value due to a change in said zero voltage output point of said first transducer being achieved by a rate of change of cabin pressure having its initial value limited by said maximum output voltage of said first transducer and tapering off to zero as said second normal value of cabin pressure is achieved; and electrical A.C. servo means interconnecting said first and second exhaust valves; said servo means positioning said second exhaust valve in accordance with the positioning of said first exhaust valve.

16. A valve control system for controlling a first pressure control exhaust valve comprising an A.C. motor energizable for rotation in a first or second direction responsive to first or second respective input signals phase displaced from one another by 180°, a first pressure measuring device including means responsive to pressure and having an output voltage related to pressure and a second pressure measuring device including means responsive to rate of pressure change having an output voltage related to rate of pressure change; said A.C. motor being operatively connected to said first valve to move said first valve toward more open and more closed positions responsive to rotation in said first or second directions, respectively; circuit connections for combining the output voltages of said first and second pressure measuring devices and for said input signal for said A.C. motor; said input signal having said first phase relationship when the output voltage of said first pressure measuring device has a first magnitude with respect to the output voltage of said second measuring device and a second phase relationship when the output voltage of said first measuring device has a second magnitude with respect to the output voltage of said second measuring device; a second exhaust valve and electrical A.C. servo means interconnecting said first and second exhaust valves; said servo means positioning said second exhaust valve in accordance with the positioning of said first exhaust valve.

17. In a cabin pressurization system comprising a pressurized cabin, means for forcing air into said cabin and a first and second exhaust valve means communicating between the interior and exterior of said cabin and controlling the exhaust of air therefrom; a first transducer device including means responsive to cabin pressure and having an output A.C. voltage related to cabin pressure, a second transducer device including means responsive to rate of change of cabin pressure and having an output A.C. voltage related to rate of change of cabin pressure, and a reversible A.C. motor constructed to rotate in a first direction responsive to a first phase energization and in a second direction responsive to a second phase energization; said A.C. motor being operatively connected to first exhaust valve means to move said first exhaust valve toward a more open position or more closed position responsive to rotation of said A.C. reversible motor in said first or second direction respectively; said first and second transducer output voltages being connected in series opposition and in series with said reversible A.C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively; and servo means interconnecting said first and second exhaust valves; said servo system including a transmitter connected to the butterfly of said first exhaust valve and a receiver connected to the butterfly of said second exhaust valve, said second exhaust valve butterfly being positioned in accordance with the positioning of said first exhaust valve butterfly.

18. In a cabin pressurization system comprising a pressurized cabin, means for forcing air into said cabin and a first and second exhaust valve means communicating between the interior and exterior of said cabin and controlling the exhaust of air therefrom; a first transducer device including means responsive to cabin pressure and having an output A.C. voltage related to cabin pressure, a second transducer device including means responsive to rate of change of cabin pressure and having an output A.C. voltage related to rate of change of cabin pressure, and a reversible A.C. motor constructed to rotate in a first direction responsive to a first phase energization and in a second direction responsive to a second phase energization; said A.C. motor being operatively connected to first exhaust valve means to move said first exhaust valve toward a more open position or more closed position responsive to rotation of said A.C. reversible motor in said first or second direction respectively; said first and second transducer output voltages being connected in series opposition and in series with said reversible A.C. motor; the net output voltage of said first and second transducers being zero when the cabin pressure is at a predetermined value, and having said first and second phase relationship when said cabin pressure is higher or lower respectively than said predetermined value to cause movement of said valve toward said more open or more closed position respectively; and servo means interconnecting said first and second exhaust valves; said servo system including a transmitter connected to the butterfly of said first exhaust valve and a receiver connected to the butterfly of said second exhaust valve, said second exhaust valve butterfly being positioned in accordance with the positioning of said first exhaust valve butterfly; and means including an adjustable stator in said servo system for adjusting the position of said second exhaust valve butterfly with respect to the position of the butterfly of said first exhaust valve.

19. In a cabin pressurization system for aircraft having means for bringing air into a pressurized cabin, valve means for exhausting air from said pressurized cabin, and electrically energizable valve control means operatively connected to said valve for controllably positioning said valve to control the air flow exhausted therethrough; a pressure measuring system for energizing said valve control means comprising a first transducer means for measuring the rate of change of cabin pressure and a second transducer means for measuring the cabin pressure; said first and second transducer means being constructed to produce output voltages related to their respective pressure measurements, and circuit means for connecting said output voltages of said first and second transducer means to said means for controlling said valve to controllably position said valve in accordance with the pressure conditions measured by said first and second transducer means; a second valve means remotely positioned from said first valve means; said first and second valve means being interconnected by servo means to position said second valve means in accordance with the positioning of said first valve means; said first and second valve means including a first and second valve butterfly respectively having a transmitter and receiver of said servo system connected thereto.

20. A cabin pressurization system for aircraft comprising a pressurized cabin, supercharger means for bringing air into said cabin and exhaust valve means connecting the interior of said cabin to the exterior of said cabin; a first pressure monitoring device for monitoring the pressure within said cabin and a second pressure monitoring device for monitoring the rate of change of pressure within said cabin; first means for connecting said first pressure monitoring device and said valve to position said valve to maintain a predetermined pressure within said cabin; second means for connecting said second pressure monitoring device and said valve to prevent movement of said valve which causes a rate of change of cabin pressure which is beyond a predetermined value; said first pressure monitoring device having adjustment means associated therewith for adjusting said predetermined pressure within said cabin, said first and second means being interconnected to allow change in cabin pressure from a first to a second predetermined pressure at an initial rate which is limited by said second pressure monitoring device and thereafter tapers down to zero as said second pressure is approached; a second valve means remotely positioned from said first valve means; said first and second valve means being interconnected by servo means to position said second valve means in accordance with the positioning of said first valve means; said first and second valve means including a first and second valve butterfly respectively having a transmitter and receiver of said servo system connected thereto.

References Cited in the file of this patent

UNITED STATES PATENTS

| | | |
|---|---|---|
| 2,491,270 | Kemper | Dec. 13, 1949 |
| 2,585,295 | Baak | Feb. 12, 1952 |
| 2,612,828 | Del Mar | Oct. 7, 1952 |
| 2,660,942 | Del Mar | Dec. 1, 1953 |